(12) United States Patent
Bedekar et al.

(10) Patent No.: US 11,979,754 B2
(45) Date of Patent: May 7, 2024

(54) CONNECTION BEHAVIOR IDENTIFICATION FOR WIRELESS NETWORKS

(71) Applicant: NOKIA SOLUTIONS AND NETWORKS OY, Espoo (FI)

(72) Inventors: Anand Bedekar, Glenview, IL (US); Anna Sillanpaa, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 331 days.

(21) Appl. No.: 17/309,823

(22) PCT Filed: Dec. 22, 2018

(86) PCT No.: PCT/US2018/067410
§ 371 (c)(1),
(2) Date: Jun. 21, 2021

(87) PCT Pub. No.: WO2020/131128
PCT Pub. Date: Jun. 25, 2020

(65) Prior Publication Data
US 2022/0046433 A1 Feb. 10, 2022

(51) Int. Cl.
*H04W 24/02* (2009.01)
*G06N 20/00* (2019.01)
*H04W 76/10* (2018.01)

(52) U.S. Cl.
CPC ............ *H04W 24/02* (2013.01); *G06N 20/00* (2019.01); *H04W 76/10* (2018.02)

(58) Field of Classification Search
CPC ....... H04W 24/02; H04W 76/10; G06N 20/00
See application file for complete search history.

(56) References Cited

U.S. PATENT DOCUMENTS 9,324,022 B2   4/2016   Williams et al.
9,794,888 B2   10/2017  Abdelmonem et al.
(Continued)

FOREIGN PATENT DOCUMENTS

CN   104871631 A   8/2015
CN   107710824 B   1/2021
(Continued)

OTHER PUBLICATIONS

Machine English translation of Bedekar et al. (CN 112475157 A) (Year: 2021).*

(Continued)

*Primary Examiner* — Nader Bolourchi
(74) *Attorney, Agent, or Firm* — Brake Hughes Bellermann LLP

(57) ABSTRACT

A method includes receiving, from a radio access network (RAN) node within a wireless network, connection event information for one or more user devices and associated channel condition information; and determining a connection behavior status of a user device based on at least a portion of the connection event information and associated channel condition information and a connection behavior status model, wherein the connection behavior status model provides a mapping or association between connection event information and associated channel condition information for one or more user devices and a connection behavior status.

20 Claims, 5 Drawing Sheets

Example Wireless Network 130

(56) References Cited

U.S. PATENT DOCUMENTS

| | | |
|---|---|---|
| 10,085,213 B1 | 9/2018 | Nimmala et al. |
| 2017/0104657 A1 | 4/2017 | Gopalakrishnan et al. |
| 2017/0332256 A1 | 11/2017 | Gupta et al. |
| 2018/0352453 A1 | 12/2018 | Gunnarsson et al. |

FOREIGN PATENT DOCUMENTS

| | | | | |
|---|---|---|---|---|
| CN | 113475157 A | * | 10/2021 | ............ G06N 20/00 |
| EP | 3282665 A1 | | 2/2018 | |
| EP | 3900475 A1 | * | 10/2021 | ............ G06N 20/00 |
| WO | 2006113876 A2 | | 10/2006 | |
| WO | 2014183664 A1 | | 11/2014 | |
| WO | 2016091298 A1 | | 6/2016 | |
| WO | 2017134641 A1 | | 8/2017 | |
| WO | 2018069180 A1 | | 4/2018 | |

OTHER PUBLICATIONS

International Preliminary Report on Patentability for PCT Application No. PCT/US2018/067410, dated May 10, 2021, 26 pages.
International Search Report and Written Opinion for Application No. PCT/US2018/067410, dated Jul. 17, 2019, 13 pages.
Written Opinion of the International Preliminary Examining Authority for PCT Application No. PCT/US2018/067410, dated Oct. 29, 2020, 7 pages.
3GPP TR 38.801, V14.0.0; 3rd Generation Partnership Project; Technical Specification Group Radio Access Network; Study on new radio access technology: Radio access architecture and interfaces (Release 14); Mar. 2017; 91 pages.
3GPP TS 38.401, V15.3.0; 3rd Generation Partnership Project; Technical Specification Group Radio Access Network; NG-RAN; Architecture description (Release 15); Sep. 2018; 39 pages.
Buda, Teodora Sandra et al., "Can machine learning aid in delivering new use cases and scenarios in 5G?", NOMS 2016—2016 IEEE/IFIP Network Operations and Management Symposium; Abstract; Apr. 25-29, 2016; 4 pages.
Maimó, Lorenzo Fernandez et al., "A Self-Adaptive Deep Learning-Based System for Anomaly Detection in 5G Networks", IEEE Access, Special Section on Cyber-Physical-Social Computing and Networking, vol. 6; Feb. 7, 2018; pp. 7700-7712.
Office Action and Search Report for Chinese Patent Application No. 201880100710.8, dated Nov. 13, 2023, 9 pages.
Office Action for European Application No. 18836443.4, dated Sep. 13, 2023, 7 pages.

* cited by examiner

CONNECTION BEHAVIOR IDENTIFICATION FOR WIRELESS NETWORKS

CROSS-REFERENCE TO RELATED APPLICATIONS

This application is a national stage entry of International Application No. PCT/US2018/067410, filed Dec. 22, 2018, entitled "CONNECTION BEHAVIOR IDENTIFICATION FOR WIRELESS NETWORKS" which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. For example, ultra-reliable and low-latency communications (URLLC) devices may require high reliability and very low latency.

SUMMARY

According to an example embodiment, a method may include: receiving, from a radio access network (RAN) node within a wireless network, connection event information for one or more user devices and associated channel condition information; and determining a connection behavior status of a user device based on at least a portion of the connection event information and associated channel condition information and a connection behavior status model, wherein the connection behavior status model provides a mapping or association between connection event information and associated channel condition information for one or more user devices and a connection behavior status.

According to an example embodiment, an apparatus may include means for receiving, from a radio access network (RAN) node within a wireless network, connection event information for one or more user devices and associated channel condition information; and means for determining a connection behavior status of a user device based on at least a portion of the connection event information and associated channel condition information and a connection behavior status model, wherein the connection behavior status model provides a mapping or association between connection event information and associated channel condition information for one or more user devices and a connection behavior status.

According to an example embodiment, an apparatus may include: at least one processor; and at least one memory including computer program code; the at least one memory and the computer program code configured to, with the at least one processor, cause the apparatus at least to: receive, from a radio access network (RAN) node within a wireless network, connection event information for one or more user devices and associated channel condition information; and determine a connection behavior status of a user device based on at least a portion of the connection event information and associated channel condition information and a connection behavior status model, wherein the connection behavior status model provides a mapping or association between connection event information and associated channel condition information for one or more user devices and a connection behavior status.

According to an example embodiment, a non-transitory computer-readable storage medium comprising instructions stored thereon that, when executed by at least one processor, are configured to cause a computing system to perform a method of: receiving, from a radio access network (RAN) node within a wireless network, connection event information for one or more user devices and associated channel condition information; and determining a connection behavior status of a user device based on at least a portion of the connection event information and associated channel condition information and a connection behavior status model, wherein the connection behavior status model provides a mapping or association between connection event information and associated channel condition information for one or more user devices and a connection behavior status.

The details of one or more examples of embodiments are set forth in the accompanying drawings and the description below. Other features will be apparent from the description and drawings, and from the claims.

DETAILED DESCRIPTION

Figure 1:
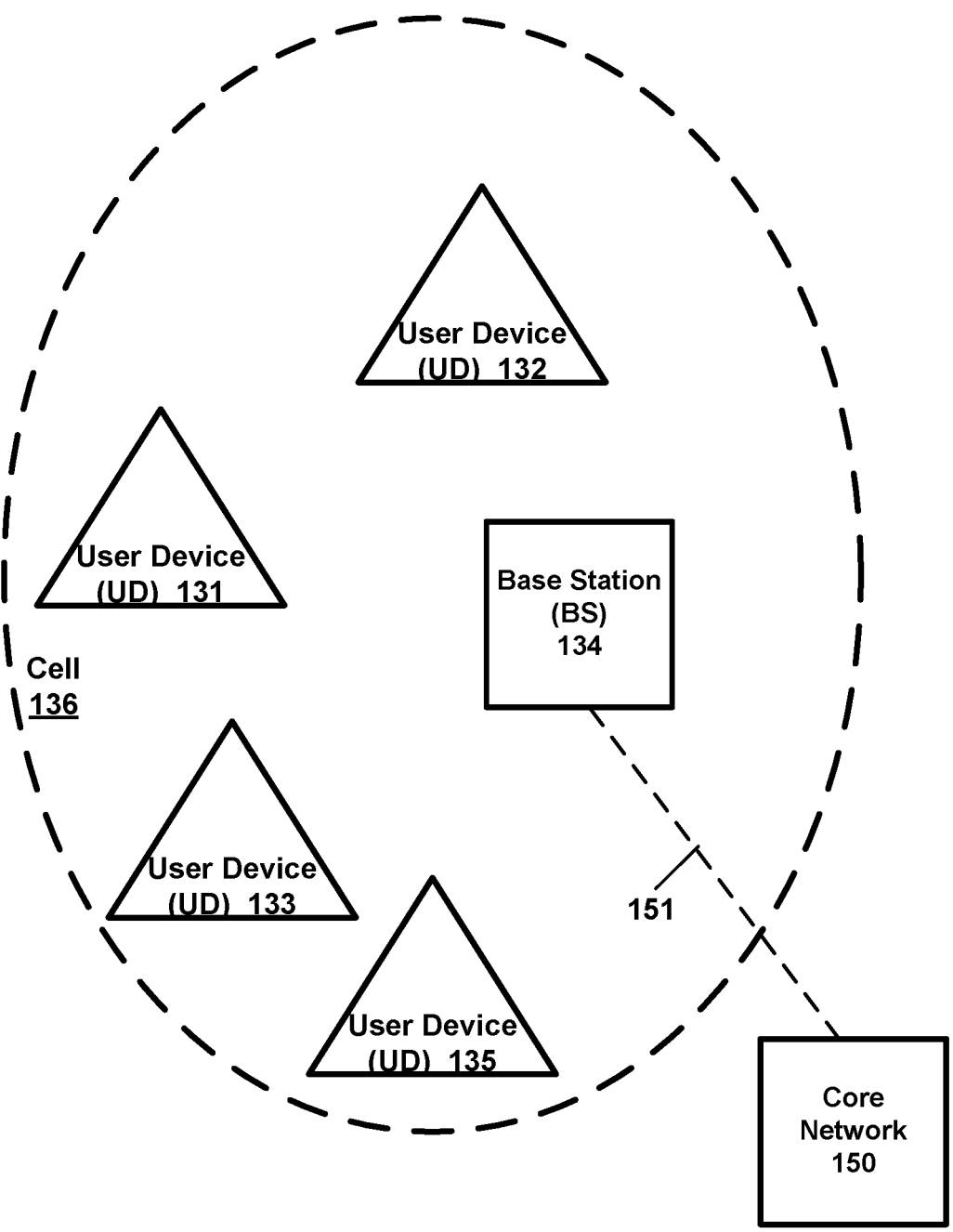
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e) Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

In some cases, some UEs may exhibit a different connection behavior. For example, different UEs, or UEs of different UE types (e.g., different UE manufacturer or model), or UEs with a different feature, or UEs with a different chipset or hardware module, antenna or software module (e.g., protocol entity) versions may have a different connection behavior, or UE with different subscriptions and subscription policies. According to an example embodiment, a connection behavior may include different connection events for the UE that occur, or typically occur, or have occurred for various conditions (e.g., for various channel conditions). For example, a connection behavior may include different channel conditions under which the UE may connect (or may typically connect) to a cell or network, and/or different conditions under which the UE may (or may typically) disconnect (or lose a connection) to a cell(s) of a network. By way of an illustrative example, a connection behavior of a UE may include, e.g., that a UE has connected to a cell for 75% of the connection attempts when the UE receives signals from the cell at a first received signal strength (RSSI) and/or using a first modulation and coding scheme (MCS) for signals received from the cell, and/or the UE has disconnected X number (or X percentage) of times (e.g., over a specific time period) from the cell when the UE is receiving signals at a second received signal strength (RSSI) and/or at a second MCS. This is merely an illustrative example of a connection behavior that may have been exhibited by a UE or a group of UEs. Other examples of a connection behavior include, e.g., that a UE has connected to a cell for 80% of the connection attempts when the strength or quality of the signal received by the UE from a cell rises from a first level to a second level (e.g., within a certain period of time) or when the UE is moving at a certain speed; or that a UE loses connection with a cell with more than 10% probability when the strength or quality of the signal received by the UE from a cell drops from a first level to a second level (e.g., within a certain period of time) or when the UE is moving at a certain speed.

For example, when a new network based on a new radio access technology such as 5G is introduced, one or more new UE implementations may not function properly or may have a low performing (or anomalous) connection behavior. Typical cases may include, by way of illustrative example: Immature chipset implementations (often due to the need to be early to market leading to inadequate testing of the chipsets); significantly more complexity introduced by a new technology like 5G e.g., more dimensions for the RF (radio frequency) environment due to massive MIMO (multiple input, multiple output) and beamforming, leading to more complex algorithms and a greater number of configurations to test and validate; newer and more complex protocols leading to unexpected scenarios that are not properly handled in the software or firmware; newer types of measurements and estimations that UEs may be required to perform but which may be noisy and inaccurate; inadequate interoperability testing between certain device variants and the network; and, problems with placement of new antenna types in the handset, etc. In addition, increased used of various frequencies and radio access technologies such as 5G, LTE and "evolved LTE" (LTE connected to 5G core) and their combinations, e.g., mmWave only or combined with lower frequencies each having different numerologies (bandwidth, slot duration, etc.) requiring tight interworking and/or air interface co-ordination to enable efficient radio interface utilization, avoid interference and support UEs with limited number of receiver and transmitters. Further example cases where at least some UE implementations may not operate properly may include UEs that implement dual connectivity, carrier aggregation, massive/multiuser/single user MIMO, and/or supplemental uplink/downlink.

Even when the network matures, some UE implementations may not function properly, e.g., such UEs may have a low performing connection behavior (e.g., which may cause a higher than desirable likelihood of failure by the low performing UE to connect (or prevent a connection of the UE) to a cell under channel conditions (e.g., under a received signal strength (RSSI) and/or MCS) that most UEs would typically be able to connect to the cell, and/or may result in a higher than desirable rate of early cell disconnection for such low performing UEs under a received signal strength where most UEs would remain connected to the cell). As cheaper implementations become widely available, they may have poorer quality, which may result in a lower performing connection behavior of such UEs.

In the case of a 5G network, many 5G cells may provide high capacity by using large bandwidths (40-100 MHz or more) and massive MIMO (16 or more antennas). It is likely that such high capacity 5G cells will be deployed in hotspots, e.g., as clusters of small cells, rather than as ubiquitous coverage providing high capacity everywhere. These high-capacity/hotspot 5G cells may, for example, employ mid-band/cmWave (3-6 GHz) or high-band/mmWave spectrum, where ample bandwidth is likely to be plentifully available. The ubiquitous coverage will be typically provided by low-band cells (sub-3 GHz, even sub-1 GHz), whose capacity is limited, as bandwidth is scarce (typically only 5-20 MHz) and massive MIMO is difficult or expensive due to the large antenna sizes that would be needed. The low-band ubiquitous coverage may use 5G/NR radio technology or LTE radio technology, or even 3G radio technology. The high-capacity/hotspot 5G cells may be independent (standalone) from the ubiquitous coverage cells, or may interact with the ubiquitous coverage cells e.g., via a nonstandalone (NSA) mode. Thus, 5G cells may overlap with other types of cells or networks, such as LTE, etc.

As noted, 5G wireless networks or cells may typically provide data rates/bandwidths and/or latency that are vastly superior to existing 4G/LTE networks/cells. Thus, to provide the highest quality performance and user experience, it may thus be desirable to increase (e.g., maximize) the probability that UEs can avail of the high capacity available in these 5G hotspot cells, for as long as time as possible, and under a widest range of channel conditions, when possible. Thus, for example, UEs should be able to quickly detect the presence of such a 5G cell as soon as they enter its coverage area (which is limited, as described above), and be able to connect to the cell as early as possible. Further, once a UE is connected to such a cell, it is important that is remain connected as long as possible, i.e., it should not drop the cell's connection too early.

However, many UE implementations may encounter problems in quickly identifying and connecting to the high-capacity 5G hotspot cells early enough, or be entirely unable to connect to the network, or encounter other connection problems such as dropped connections. As mentioned above, new UE implementations will often demonstrate low performing connection behavior, and one example of the likely consequences of this low connection performance is inability to connect to a 5G hotspot cell sufficiently early, leading to poorer 5G experience from the user's perspective. For example, a normal (or average) performing UE (e.g., with normal or average connection behavior) may typically be able to connect to a 5G cell at a received signal strength indication (RSSI) of received signals of X dB, but a low performing UE may be unable to establish a connection to the 5G cell until RSSI of received signals from the cell are at X dB+3 dB, as an illustrative example. This may cause the low performing UE to connect later (at a higher RSSI) to the 5G cell, and to disconnect earlier from the 5G cell, e.g., due to a smaller range of channel conditions that are acceptable to the UE to establish and maintain a connection to the 5G cell.

Therefore, according to an example embodiment, one or more techniques are described that allow identification or classification of individual UE(s) or a group(s) of UEs that have a low performing connection behavior, e.g., UEs that are unable to connect to the 5G hotspot cells, or that can connect but not "early enough", or that drop a connection from the high-capacity 5G cell too early. After a UE (or a group of UEs) have been identified or classified as having a low performing connection behavior (e.g., a connection behavior status of Low or low performing connection behavior), then one or more network corrective actions may be performed in order to improve the connection behavior of the UE (e.g., adjust MCS for the UE to a more robust MCS, increase transmission power of signals transmitted to or from the UE, adjust signal thresholds for handover decisions between cells for the UE, adjust radio resource management (RRM) thresholds or decision criteria, adjust RRM thresholds or decision criteria depending on the type or quality of service that the UE is conducting such as gaming or voice over IP or voice over LTE/NR, or depending on a network slice that the UE is part of, etc.,) or other network corrective action(s) that may improve the connection behavior of the low performing UE. Other network corrective action(s) may include associating the observations or identification of low performing connection behavior by a UE with an identifier of a UE such as an IMSI (international mobile subscriber identity) or IMEI (international mobile equipment identity) or TMSI (temporary mobile subscriber identity), counting the occurrences of observations or identification of low-performing connection behavior across multiple connection attempts by a UE based on its associated IMSI/IMEI/TMSI, and invoking network corrective actions when the number or frequency of occurrences reaches a sufficiently high value. Corrective actions may further include offering billing adjustments or other credits to a subscriber whose UE has been identified as having low performing connection behavior for 5G high-capacity/hotspot cells, or other customer experience management/improvement actions to improve customer satisfaction such as providing a higher quality of service on a different network layer (such as the ubiquitous coverage lower-band layer) to compensate for low performing connection behavior towards 5G high-capacity/hotspot cells. Corrective actions may also include identifying that a significant number of UEs of a given UE type (such as UEs having a common chipset version, or UEs manufactured by a given device manufacturer) have low performing connection behavior, and invoking corrective actions towards the chipset or device manufacturer to troubleshoot. It should be noted that while various embodiments may be described with references to 5G networks and for connection behavior for 5G high-capacity/hotspot cells, they are equally applicable to networks of any radio access technology, including but not limited to LTE, evolved LTE (eLTE), 3G, WiFi, IEEE 802.11 variants, MulteFire, NB-IOT, and the like, and to a variety of types of cells including high-coverage cells or macro cells or small cells or the like.

A connection behavior status model may be provided and/or trained, wherein the connection behavior status model may provide a mapping or association between connection event information and associated channel condition information for one or more UEs and a connection behavior status.

In an example embodiment, connection event information may include information describing (or related to) any connection-related events of a UE or group of UEs, or any information that may indicate or describe the connection performance of the UE(s). By way of illustrative example, the connection event information may include at least one of the following (by way of illustrative examples): a connection event, including one or more of: a successful connection attempt to a cell by a user device; a user device performing or initiating a random access procedure with a cell; a user device successfully starting transmission to a cell for control signals or data; a user device measuring or detecting that a received signal level or a received signal quality is above a first level; and a cell providing the user device with configuration information to allow the user device to configure itself for communication with the cell; and a loss of connection event, including one or more of: an unsuccessful connection attempt to a cell by a user device; a user device being unable to transmit or receive data or control signals to a cell; at least a threshold number or threshold rate of data retransmission events with a cell; and at least a threshold number or a threshold rate of decoding errors.

In an example embodiment, the associated channel condition information may include information describing a channel condition that is associated with a connection event (s). For example, the associated channel condition information may include information related to or describing a channel condition that existed or was detected a certain period of time prior to the connection event, during the occurrence of the connection event, and/or within a certain period of time after the connection event. As illustrative examples, associated channel condition(s) may include one or more of: a channel quality information, a data error rate or block error rate, a channel state information (CSI), a reference signal received power (RSRP), a reference signal received quality (RSRQ), a signal to interference plus noise ratio (SINR), a timing advance measured from a random access (RACH) transmission, a direction and/or angle of arrival of signals, beam information indication for transmit or receive beams, per antenna measurements (e.g., antenna strength and/or phase). In some examples, the UE may be connected to a first cell which may be a low-band cell, and the connection event may relate to the UE's connection (or attempt to connect) to a second cell which may be a 5G high-capacity/hotspot cell. In other examples, the connection event may relate to the UE's loss of connection from a second cell which may be a 5G high-capacity/hotspot cell, while remaining connected to a first cell which may be a lower-band cell or a primary cell (Pcell) or a master eNB (MeNB). The associated channel condition information may be on the first cell and/or the second cell. For example, in the case of a connection event representing the UE's connection (or attempt to connect) to a second cell which may be a 5G high-capacity/hotspot cell, the associated channel condition information in the period of time prior to the connection event may represent channel conditions of the UE in the first cell, and the associated channel condition information in the period of time after the connection event may represent the channel conditions of the UE in the second cell after the connection event.

A connection behavior status may be a status or classification assigned to a UE (or to a group of UEs) that indicates a connection behavior (e.g., a connection performance) of the UE(s). The connection behavior status may be assigned with respect to a particular connection event by a particular UE with respect to a particular 5G high-capacity/hotspot cell. Or it may be more broadly assigned to a particular UE based on multiple connection events to a particular 5G high-capacity/hotspot cell. Or it may be yet more broadly assigned to one or more UEs based on multiple connection attempts to one or more 5G high-capacity/hotspot cells. This connection behavior status may, for example, be used to perform network corrective action(s) for the UE, and/or may be sent to one or more other network nodes to perform network corrective actions and/or perform updates to a UE profile stored in the core network or other location. A wide variety of connection behavior statuses (or status formats) may be used to classify or categorize UEs based on their connection performance. For example, two connection behavior status may be used: low (low performing connection behavior status) and high (high performing connection behavior status), or a numeric value may be assigned (e.g., a value between 0 and 100) representing the performance of the UE's connection behavior. For example, one or more network corrective actions may be applied to a UE that has a low performing connection behavior status, in order to improve the connection behavior of such low performing UEs, whereas no network corrective actions may be necessary for a UE having a high performing connection behavior status. Or, in another example embodiment, three connection behavior status may be used, e.g.: low (low performing connection behavior status), medium (or medium performing connection behavior status), and high (high performing connection behavior status), where more network corrective actions may be applied to improve the UE that has a low performing network connection behavior status (e.g., adjust MCS and increase transmission power), and fewer or different network corrective actions may be applied to the UE having a medium performing connection behavior status, and, for example, no network corrective actions may be necessary for a UE having a high performing connection behavior status. This is merely an illustrative example. Thus, different network corrective actions may be applied to UEs that have different connection behavior statuses.

In another example embodiment, a connection behavior status of a UE may be a number (e.g., between 0 and 10, or between 0 and 1) that may indicate a likelihood that the UE is a low performing UE (e.g., in need of network corrective actions to improve connection behavior), e.g., where a connection behavior status of 0.7 indicates a 70% probability (for example) that the UE has a low performing connection behavior and thus may be in need of one or more network corrective actions to improve connection performance. Or, in another example embodiment, a connection behavior status may be a number indicating a level of network connection performance of the UE, or may indicate a relative need of network corrective action for the UE (e.g., a connection behavior status between 0.5 and 1.0 may indicate a normal or high performing UE where no network corrective actions are necessary, while a connection behavior status between 0 and 0.49 may indicate a lower performing UE in which the UE may benefit from network corrective actions to improve connection performance. These are merely some examples, and other types of connection behavior status may be used.

As noted, a connection behavior status model may be provided and/or trained, wherein the connection behavior status model may provide a mapping or association between connection event information and associated channel condition information for one or more UEs and a connection behavior status. In an example embodiment, the connection behavior status model may be, for example, an artificial intelligence (AI) neural network model, or other model. Other models, e.g., simpler models, may be used as well. For example, after the connection behavior status model (which may be based on or trained based on connection event information and associated channel condition information for many UEs and many events) has been determined or trained, connection event information (e.g., describing one or more events) for a UE and associated channel condition information may be received. Then, a connection behavior status of the UE may be determined (e.g., the UE connection behavior may be classified) based on the connection event information, associated channel condition information, and the connection behavior status model. For example, if the model indicates that 80% (by way of example) of UEs are able to connect to a cell at a first MCS and based on signals received from the cell at a first RSSI (RSSI 1), and the connection event information and associated channel condition information for this UE indicates that this UE is unable to connect to this cell until RSSI is at least RSSI 1+3 dB, then the model may output a connection behavior status of this UE that indicates a low performing connection behavior status. Based on this, one or more network corrective actions may be recommended or performed to improve the connection behavior of the UE.

In some cases, a group or subset of UEs may have a common aspect or feature, e.g., which may cause many or most (or even all in some cases) of the UEs of this group or subset of UEs to have a same or similar connection performance, at least in some cases. According to an example embodiment, one or more common features or aspects of a group or subset of UEs may include one or more of the following: a same UE brand or manufacturer; a same UE model (or UEs of the same type); UEs that include a same semiconductor chip or chipset; UEs that include a same version of a protocol entity; UEs that include a same hardware module; UEs that include a same software module; UEs that include a same antenna system or antenna configuration, etc. These are some examples, and other common features or aspects may be used to group UEs together, which may have a common or at least similar connection performance. In this example, connection event information and associated channel condition information may be received from a plurality of UEs of this subset or group of UEs that have this common or shared aspect or feature. The model may then be determined or trained for at least this group or subset of UEs. Thus, in this example, the connection behavior status model may be determined or trained based on the connection event information and associated channel condition information for UEs within this subset or group of UEs that have this common or same aspect or feature (e.g., resulting in a group-specific connection behavior status model). Then, for a new UE, that is also within this group or subset that has or shared this common aspect or feature of the subset or group of UEs, a connection behavior status or classification for the new UE may be determined based on the connection event information and associated channel condition for the new UE, and the group-specific connection behavior status model. It may also be that while the model may be trained based on data from a large population of UEs, and while the identification of connection behavior status is made for individual UEs or their connection events, groups of UEs may be identified which have common shared aspects or features as noted above and which demonstrate higher than desired or higher than typical frequency of being classified as having poor connection behavior status.

According to an example embodiment, a network corrective action with respect to the UE to improve a connection behavior of the UE may include, for example, at least one of: adjusting a modulation and coding scheme (MCS) of the user device, adjusting transmission power of the user device for uplink transmissions, adjusting downlink transmission power for transmissions to the user device, adjusting a retransmission timing or strategy, adjusting signal threshold (s) for handover of the user device between cells, adjusting resource scheduling for the user device, adjusting a control channel element (CCE) selection for a physical downlink control channel (PDCC), adjusting beamforming or other MIMO transmission strategy, updating a subscription profile for a user device to indicate the connection behavior status of the user device, triggering or causing an update to a subscription plan or charging/billing for a user device or subscriber, triggering or causing a call trace to collect data for the subscriber or user device connection, determining or maintaining counts of the connection events or changes to the connection behavior status of a user device, causing or triggering a problem report or status report to be generated and/or transmitted to a hardware or software or device manufacturer. These are some examples, and other network corrective actions may be used or performed to improve a connection behavior of the UE, e.g., at least in cases where the classification or connection behavior status of the UE indicates that the UE is a low performing UE (low performing connection behavior) or that the UE may benefit from (or may be in need of) one or more network corrective actions to improve connection behavior of the UE.

Therefore, according to an example embodiment, a method may include receiving, from a radio access network (RAN) node (e.g., BS) within a wireless network, connection event information for one or more UEs and associated channel condition information; and determining a connection behavior status of a UE based on at least a portion of the connection event information and associated channel condition information and a connection behavior status model, wherein the connection behavior status model provides a mapping or association between connection event information and associated channel condition information for one or more UEs and a connection behavior status.

According to an example embodiment, the method may further include determining the connection behavior status model that provides a mapping or association between connection event information and associated channel condition information for one or more UEs and a connection behavior status. The method may further include performing, or sending a message to cause another network node to perform, based on the connection behavior status of the UE (or user device), a network corrective action with respect to the UE to improve a connection behavior of the UE.

Figure 2:
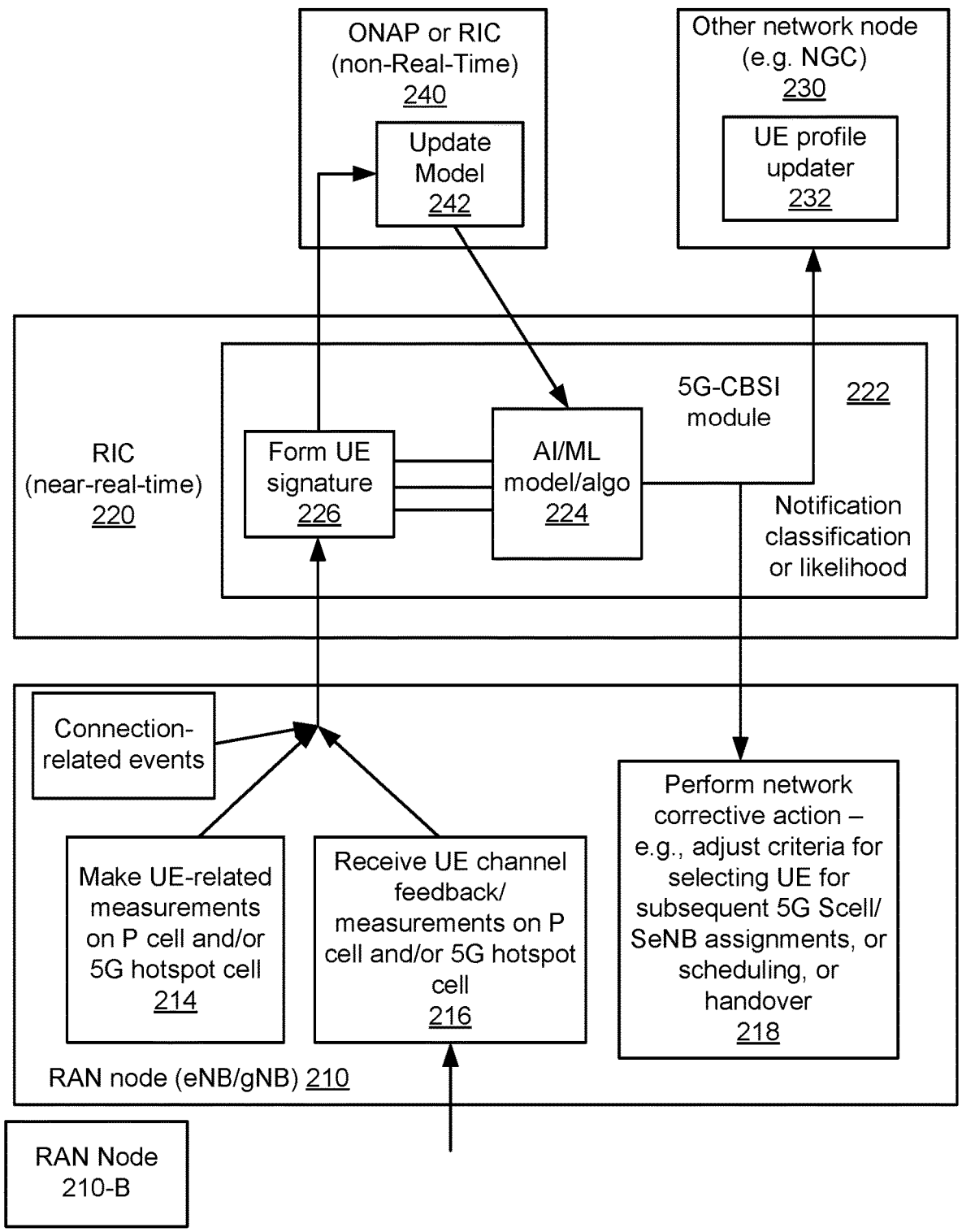
FIG. 2 is a diagram illustrating a system according to an example embodiment.

FIG. 2 is a diagram illustrating a system according to an example embodiment. The system may include, for example, a RAN (radio access network) node (e.g., such as a eNB, gNB or BS) 210 that may provide wireless services and connections to one or more UEs or user devices, a RAN Intelligent Controller (RIC) 220 (e.g., which may be near real-time), an ONAP (Open Network Automation Platform) or RIC 240 (e.g., which may be non real-time) which may provide model updating or model training at 242, and another network node 230, which may be, for example, a core network or next generation core (NGC) node, or an online or offline charging system, or a billing support system (BSS), or an operations support system (OSS), or a network operation center (NOC), or a network management system (NMS), or customer experience management (CEM) system, or a home subscriber server (HSS) or the like.

According to an example embodiment, the RAN node 210 (e.g., eNB or gNB) may include several elements such as a central unit (CU), a distributed unit (DU), and a radio unit (RU), e.g., as described in 3GPP Technical Report 38.401. The central unit (CU) may provide upper layer RAN functions, for example control plane functions such as radio-resource control (RRC) and user-plane functions such as Packet Data Convergence Protocol (PDCP) and dual-connectivity/multi-connectivity. The CU may include a control plane element (CU-CP) and a user-plane element (CU-UP). The CU and DU may interact with each other over an F1 or a W1 interface. The CU-CP and CU-UP may interact with each other over a E1 interface. The various functions of the RAN node 210 may be implemented in the CU, or in the DU, or partly in the CU and partly in the DU, without restriction.

As shown in FIG. 2, at 212, the RAN node 210 may detect or determine connection event information (associated with a connection event(s) and/or a loss of connection event(s)) for one or more UEs that are connected to the RAN node, for example. At 214, the RAN node 210 may make UE-related measurements (e.g., measurements of (or related to) one or more signals received from the UE) on a primary cell (Pcell) and/or 5G hotspot cell. At 216, the RAN node 210 may receive UE channel feedback or UE measurements on primary cell or 5G hotspot cell, for example.

In some embodiments, the RAN node 210 may provide all of the RAN functions associated with a UE's primary cell (PCell) or a Master eNB or a Master gNB, as well as the functions associated with a secondary cell (Scell) or a Secondary eNB (SeNB) or Secondary gNB (SgNB). In some embodiments, the RAN node 210 may provide a part of the RAN functions, while another RAN node 210-B may provide other relevant RAN functions. For example, the RAN node 210 may provide the functions of only the Pcell (or MeNB or MgNB), and another RAN node 210-B may provide the functions associated with the Scell (or SeNB or SgNB). Alternatively, the RAN node 210 may provide the functions associated with the Scell (or SeNB or SgNB) while RAN node 210-B may provide the functions of the Pcell (or MeNB or MgNB). In some embodiments, the RAN node 210 may provide upper layer or central-unit (CU) RAN functions, while RAN node 210-B may provide lower-layer or distributed-unit (DU) RAN functions. Yet other embodiments may be possible where the functions of the Pcell/MeNB/MgNB and the Scell/SeNB/SgNB are split across one or more RAN nodes in other ways. RAN node 210 may interface to a RAN node 210-B using an X2 or an Xn interface, or using an F1 interface, or other interfaces. In cases where a UE uses dual-connectivity to connect to a 5G gNB supporting a high-capacity/hotspot cell while also being connected to a LTE primary cell or master eNB, the 5G gNB may be at RAN node 210 while the LTE primary cell may be at RAN node 210-B, or vice-versa (i.e., in such an illustrative example, the 5G gNB may be at RAN node 210-B while the LTE primary cell may be at RAN node 210). In case of such dual connectivity, a variety of options for dual connectivity between LTE and 5G may be employed, such as Option 3/3a/3x or Option 4/4a or Option 7/7a/7x or the like, e.g., as described in 3GPP Technical Report (TR) 38.801.

In some cases, RAN node 210 may receive partial information about the connection event and associated channel conditions related to the Pcell/MeNB/MgNB, while RAN node 210-B may receive other partial information about the connection event and associated channel condition information. For example, the RAN node 210 may provide the functions of the Pcell/MeNB/MgNB, while RAN node 210-B may provide the functions of the Scell/SeNB/SgNB. In such cases, the RAN node 210 may obtain information related to channel conditions on the Pcell/MeNB/SeNB, while the RAN node 210-B may receive information about a connection event such as UE's connection attempt to the Scell or SeNB/SgNB and associated channel conditions of the UE relative to the SgNB/SeNB/Scell after the connection event. Alternatively, for example, the RAN node 210 may provide upper layer or central-unit or CU functions, while RAN node 210-B may provide lower layer or distributed unit or DU functions. In such cases, RAN node 210 may receive connection event information and associated channel condition information via upper layers, such as radio resource control (RRC), for example via RRC connection attempt information and RRC measurements, while RAN node 210-B may receive connection attempt and associated channel condition information via lower layers such as Layer 1/Physical Layer or Layer 2/Medium Access Control (MAC), for example via RACH attempts and Channel State Information (CQI) or Channel Quality Indicator (CQI) or Precoding Matrix Indicator (PMI) or Rank Indicator (RI) or Power Headroom Report (PHR) or the like. In such cases, the RAN node 210-B may convey information about the connection event and associated channel condition information to the RAN node 210. This conveying of information from the RAN node 210-B to RAN node 210 may occur over X2 or Xn or F1 interfaces or other interfaces, depending on the functionality provided by the RAN node 210 and RAN node 210-B. The RAN node 210 may then combine its own information about the connection event and the associated channel conditions together with the information received from RAN node 210-B to form the overall information about the connection event and associated channel information.

Also, based on connection event information and associated channel condition information collected or received for one or more UEs, a model (e.g., a connection behavior status identification (CBSI) model) 224 may be determined or developed that may provide a mapping or association between connection event information and associated channel condition information for a UE and a connection behavior status for the UE. In this manner, the model may be trained or developed. The model 224 may be a relatively simple model that may use one or more relatively simple rules. For example, the model may track the received signal strength (RSSI) at which a majority of UEs are able to connect and maintain a connection with a cell. And, UEs that are unable to connect and/or maintain a connection at such RSSI may be classified as low performing connection behavior status (e.g., where the RAN node (e.g., BS), core network, or other network node may perform one or more network corrective actions to improve the connection behavior of such UE). Otherwise, if the UE is able to connect and maintain a connection at such RSSI, then the UE may be classified as a normal or high performing connection behavior status (e.g., in such case, either less network corrective actions may be performed, or no network corrective actions may be performed, in contrast to a lower performing connection behavior that may benefit from one or more network corrective actions). This is merely one illustrative example of a model.

The model 224 may also be significantly more complex, and may be based on many different connection events and channel conditions. In some cases, the model 224 may be an artificial intelligence (AI) neural network model, for example. For example, the model may include an artificial intelligence/machine learning (AI/ML) method (e.g., clustering or Neural network), which may be applied to a UE signature formed from the time-trace or vector of events and sequence of channel conditions/measurements before, during and/or after the event, to determine the classification or connection behavior status of the UE, which may include, for example, a likelihood that the UE is a particular connection behavior status (e.g., a likelihood the UE has a low performing connection behavior or should be classified as a low performing connection behavior status).

A) As shown in FIG. 2, a 5G-Connection Behavior Status Identification (CBSI) module 222 may receive (via 212, 214 and 216) the connection event information about events of one or more UE's connection (or loss of connection) to a 5G hotspot cell, along with associated UEs' channel condition information in a time interval preceding, during and/or after the event from the RAN node (e.g., BS, eNB or gNB) 210.

B) The 5G-CBSI module 222 may determine a classification or a connection behavior status of the UE, which may be (or may include), for example, a likelihood of one or more UEs as being 'anomalous' or low performing UE for connections to 5G hotspot cell(s), based on information of connection/loss of connection events and the associated channel conditions.

According to an example embodiment, the 5G-CBSI module 222 may determine a UE signature (at 226) for the UE based on the received connection event information and associated channel conditions. The UE signature may be calculated to reflect the connection events and associated channel conditions for the UE. Different techniques or algorithms may be used to generate a UE signature. For example, the UE signature may be formed from a time-trace or vector of connection event(s) and time-sequence of associated channel conditions before, and/or during, and/or after the connection event(s), and/or a mathematical function thereof. For example, the UE signature may consist of a vector that includes: timestamp at which a connection event occurred and an identifier of a connection event (e.g., whether the connection event was a RACH attempt or a RRC connection attempt or the like), a sequence of associated channel condition information or measurements related to the UE that were performed in a time period preceding the connection event along with associated time-stamps, and a sequence of associated channel condition information or measurements related to the UE that were performed in a time-period after the connection event along with time-stamps associated with the measurements. Further, the UE signature may also comprise a mathematical function of the measurements, such as an average, or a first derivative representing a rate of change of a measurement such as a signal strength level, or the like.

The UE signature (and/or the connection events and associated channel conditions for the UE) is provided or input to the model (e.g., AI neural network model) 224. The 5G-CBSI module 222 may determine a classification or a connection behavior status of the UE based on the UE signature (and/or the connection events and associated channel conditions for the UE) and the model 224. Also, UE signature (and/or the connection events and associated channel conditions for the UE) may be provided to the RIC 240, where an updated model (at 242) may be determined. The updated model may be provided back to the 5G-CBSI module 222.

C) A notification of the UE classification or the connection behavior status of the UE is provided (or output) by the 5G-CBSI module 222 to the other network node (e.g., core network) 230 and/or to the RAN node 210. The node 230 may update the UE profile, e.g., based on the classification or connection behavior status of the UE. For example, the UE profile may include a subscription status of the UE, an identifier of the UE such as an IMEI or an IMSI, and a variety of characteristics of the UE such as the amount of data the UE has consumed during a current billing period, or the quality of service associated with the UE. Typically the attributes associated with the UE are associated with the identifier such as IMEI or IMSI and can be queried or retrieved for specific identifiers or groups of identifiers by the operator. As part of the UE profile, the other network node 230 may maintain counts or frequencies or other measures of likelihood of the UE being classified as showing low connection performance behavior. Associated databased may be maintained at the other network node, such as an IMEI registry which keeps track of which IMEIs of UEs connect to the network and various attributes or characteristics of observations or measurements associated with various IMEIs, or a subscriber database which tracks which IMSIs connect to the network and various attributes or characteristics of observations or measurements associated with various IMSIs. As an example, when the notification of the UE classification or the connection behavior status of the UE is provided (or output) by the 5G-CBSI module 222 to the other network node 230, the notification may carry an identifier of the UE, such as an eNodeB UE S1-AP identity for the S1-AP interface, or a temporary mobile subscriber identity (TMSI), or IMSI, or IMEI or the like. Based on this, the network node 230 can associate the received notification with the UE profile of a particular UE. The network node 230 may then update a counter representing a cumulative number of times the UE was classified as having a given connection behavior status, or equivalently, a frequency or likelihood of the UE being classified as having a given connection behavior status.

Also, at 218, the RAN node 210 may perform one or more network corrective actions for the UE, e.g., based on the UE classification or the connection behavior status of the UE. As noted, a variety of different network corrective actions may be used to improve a connection behavior of the UE, e.g., if the UE has a low performing connection behavior status. Some example network corrective actions may include, e.g., adjusting a MCS of signals transmitted to or by the UE to be a more robust MCS, increasing transmission power of signals transmitted to or by the UE, adjusting a criteria for selecting the UE for subsequent Scell/SeNB (secondary cell or secondary RAN node/BS) assignments for the UE, adjusting a scheduling of resources for the UE, and/or adjusting one or more thresholds or parameters for performing a handover of the UE between cells or BSs/gNBs for example. These are just a few examples of network corrective actions that may be used to improve connection behavior of a UE that may have a low performing connection behavior status.

The other network node 230 may be the RAN node (e.g., 210, or other RAN node), or an orchestration/management system such as ONAP, or in ORAN architecture, a RIC, or a core network element (MME/NGC), for example. The other network node 230 can invoke network corrective action based on the notification of the UE classification or UE connection behavior status, or based on the results of the update to the UE profile performed on receiving the notification. A connection behavior status of a UE may, in some cases, change over time, as the events and associated channel conditions for the UE change, and/or as the model changes.

The 5G-CBSI module 222 can be hosted (or run on) at either a RIC (e.g., RIC-near-RT (real time) or a RIC-non-RT (non real-time): Hosting (or running or executing) 5G-CBSI module 222 at RIC-near-RT would enable 'online' application for the method or techniques described herein, e.g., to classify a UE (to determine a connection behavior status of the UE) while it is still connected to a cell, enabling near-real-time network corrective actions to be applied (e.g., by the cell that is connected to the UE) to improve the connection behavior of the UE, and thereby possibly avoid an early dropped connection (associated with a low performing connection behavior status), e.g., by increasing transmission power, using a more robust MCS, etc.

Hosting or running the 5G-CBSI module on a real-time (or near real-time) RIC may allow more recent (e.g., within a threshold period of time) UE signature or more recent UE events and channel conditions to be input to module 222 (e.g., and may also allow use of a more recently updated model 224) and used to quickly generate a classification or connection behavior status for a UE or for a UE connection to a cell. A non-real-time hosting of the module 222 may, for example, use a previous or only older (or historical) UE signature or connection events and channel conditions and a previous/older model, to determine a classification or connection behavior status of the UE. Thus, for example, a real-time (or near real-time) implementation of the module 222 may allow a classification or connection behavior status to be determined based on recent data, e.g., data within a threshold period of time (e.g., connection events and channel conditions that occurred or were detected within the last 100 ms). Whereas, for example, a non-real-time implementation of module 222 may use data (events and channel conditions and/or model) that may be older than the threshold period of time (e.g., older than 100 ms). These are merely some illustrative examples.

Hosting at RIC-non-RT (RIC non-real time) would enable offline identification or classification or offline determination of the behavior status of the UE. Also for example, in ORAN architecture, model development or training can be done at RIC-non-real-time, for example, or other node or location.

As noted above, the model 224 may be an artificial intelligence model, a neural network model, an AI neural network model, (e.g., which alternatively may be referred to as an AI model, an AI neural network, a neural network, a neural network model or a model, or by other term), or a machine learning (ML) model. AI models or neural networks are computational models used in machine learning made up of nodes organized in layers. The nodes are also referred to as artificial neurons, or just neurons, and perform a function on provided input to produce some output value. A neural network requires a training period to learn the parameters, i.e., weights, used to map the input to a desired output. The mapping occurs via the function. Thus, the weights are weights for the mapping function of the neural network. Each AI model or neural network model may be trained for a specific task. According to an example embodiment, one task may include improving the performance of a radio network (or at least decreasing a reduction in radio network performance). The task performed by the AI model or neural network model is determined by the inputs provided, the mapping function, and the desired output.

To provide the output given the input, the neural network must be trained, which may involve learning the proper value for a large number of parameters for the mapping function. The parameters are also commonly referred to as weights as they are used to weight terms in the mapping function. This training may be an iterative process, with the values of the weights being tweaked over thousands of rounds of training until arriving at the optimal, or most accurate, values. In the context of neural networks, the parameters may be initialized, often with random values, and a training optimizer iteratively updates the parameters, also referred to as weights, of the network to minimize error in the mapping function. In other words, during each round, or step, of iterative training the network updates the values of the parameters so that the values of the parameters eventually converge on the optimal values.

Machine Learning models can be trained in either an supervised or unsupervised manner. In supervised learning, training examples are provided to the neural network or other machine learning algorithm. A training example includes the inputs and a desired or previously observed output. Training examples are also referred to as labeled data because the input is labeled with the desired or observed output. In the case of a neural network, the network learns the values for the weights used in the mapping function that most often result in the desired output when given the training inputs. In unsupervised training, the machine learning model learns to identify a structure or pattern in the provided input. In other words, the model identifies implicit relationships in the data. Unsupervised learning is used in many machine learning problems and typically requires a large set of unlabeled data.

Also, in some example neural network models and other machine learning models, learning may be performed based on data, and a cost function, or a reward function. For example, a cost function may provide a measure or indication of how far away a particular solution is from an optimal (or desired) solution to a problem to be solved. Whereas, a reward or reward function may indicate that an output is closer to a desired or optimal solution.

According to an example embodiment, the learning or training of a neural network model may be classified into two broad categories (supervised and unsupervised), depending on whether there is a learning "signal" or "feedback" available to a model. Thus, for example, within the field of machine learning, there may be two main types of learning or training of a model: supervised, and unsupervised. The main difference between the two types is that supervised learning is done using known or prior knowledge of what the output values for certain samples of data should be. Therefore, the goal of supervised learning is to learn a function that, given a sample of data and desired outputs, best approximates the relationship between input and output observable in the data. Unsupervised learning, on the other hand, does not have labeled outputs, so its goal is to infer the natural structure present within a set of data points.

Supervised learning: The computer is presented with example inputs and their desired outputs, and the goal may be to learn a general rule that maps inputs to outputs. Supervised learning may, for example, be performed in the context of classification, where a computer or learning algorithm attempts to map input to output labels, or regression, where the computer or algorithm may map input(s) to a continuous output(s). Common algorithms in supervised learning may include, e.g., logistic regression, naive Bayes, support vector machines, artificial neural networks, and random forests. In both regression and classification, a goal may include to find specific relationships or structure in the input data that allow us to effectively produce correct output data. As special cases, the input signal can be only partially available, or restricted to special feedback: Semi-supervised learning: the computer is given only an incomplete training signal: a training set with some (often many) of the target outputs missing. Active learning: the computer can only obtain training labels for a limited set of instances (based on a budget), and also has to optimize its choice of objects to acquire labels for. When used interactively, these can be presented to the user for labeling. Reinforcement learning: training data (in form of rewards and punishments) is given only as feedback to the program's actions in a dynamic environment, e.g., using live data.

Unsupervised learning: No labels are given to the learning algorithm, leaving it on its own to find structure in its input. Some example tasks within unsupervised learning may include clustering, representation learning, and density estimation. In these cases, the computer or learning algorithm is attempting to learn the inherent structure of the data without using explicitly-provided labels. Some common algorithms include k-means clustering, principal component analysis, and auto-encoders. Since no labels are provided, there is no specific way to compare model performance in most unsupervised learning methods.

Figure 3:
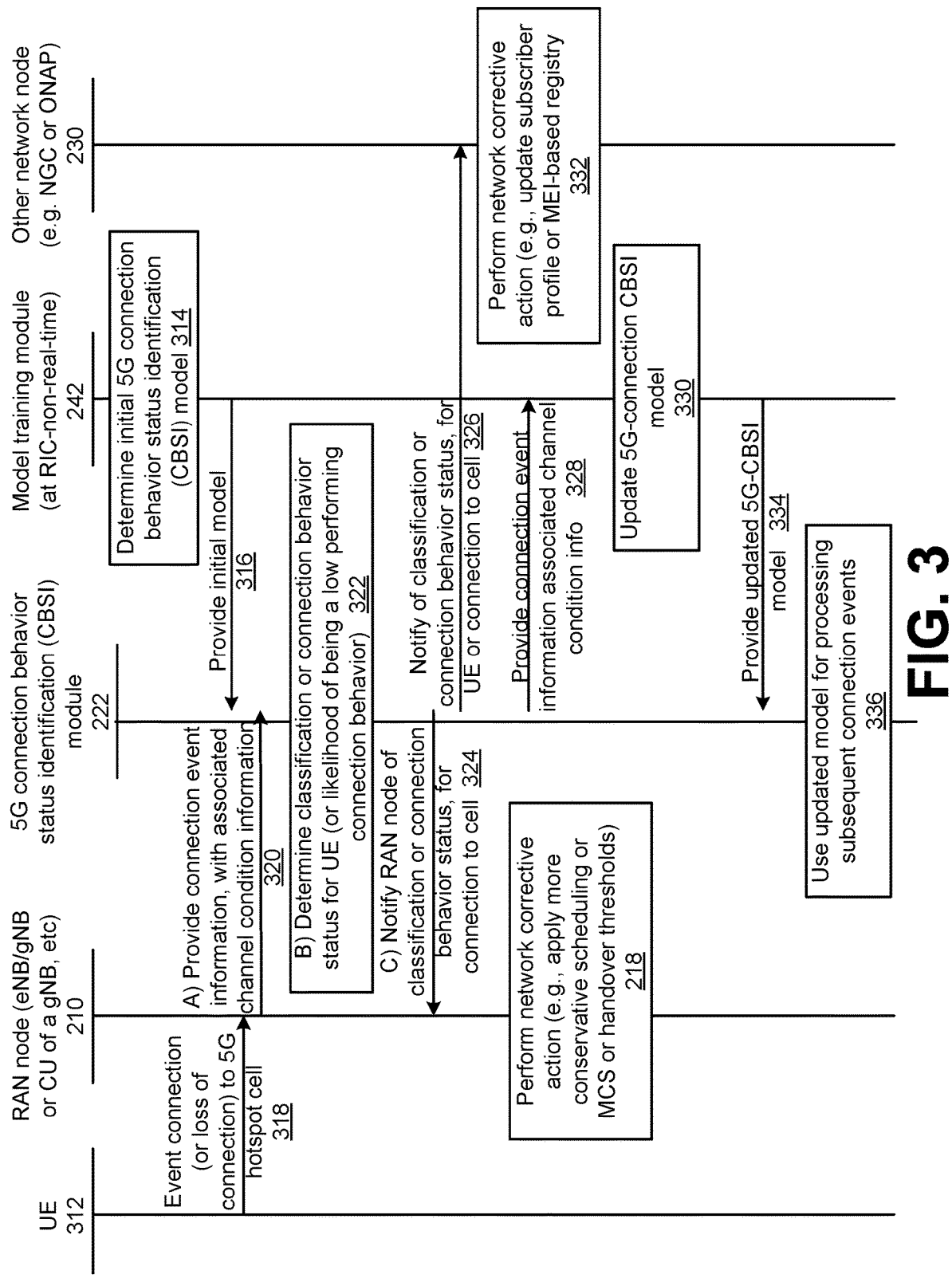
FIG. 3 is a diagram illustrating a signal diagram according to an example embodiment.

FIG. 3 is a diagram illustrating a signal diagram according to an example embodiment. As shown in FIG. 3, the system may include a UE 312, a RAN node 210, a 5G connection behavior status identification (5G-CBSI) module 222, a model training module 242, and another network node (e.g., which may be a next generation (or 5G) core network node, a RAN node, or other node) 230.

At 314, model training module 242 may determine an initial 5G connection behavior status identification (5G-CBSI) model. At 316, module 242 provides the initial 5G CBSI model to the 5G CBSI module 222. At 318, the RAN node 210 may receive or may determine connection event information (describing one or more connection or loss of connection events).

A) At 320, the RAN node 210 provides the connection event information and associated channel condition information to the 5G CBSI module 222.
B) At 322, the 5G CBSI module 222 determines a classification or connection behavior status for the UE, e.g., which may be a likelihood of the UE having a low performing connection status behavior.
C) At 324, the 5G CBSI module 222 notifies RAN node 210 of the classification or connection behavior status of the UE (for example, the UE may be connected to the cell/RAN node 210, or may be or may have attempted to connect to the RAN node or cell, etc.).

At 326, the 5G CBSI module 222 notifies other network node 230 of the classification or connection behavior status of the UE. At 328, the 5G CBSI module 222 notifies model training module 242 of the received connection event information and associated channel condition information for the UE. At 218, the RAN node 210 may perform one or more network corrective actions for the UE, e.g., to improve the connection behavior of the UE, based on the classification or connection behavior status of the UE. At 330, the model training module 242 may update the 5G CBSI model based on the receive connection event information and associated channel condition information for the UE. At 332, the other network node, (e.g., core network node) may perform a network corrective action (e.g., based on the classification or connection behavior status of the UE), e.g., which may include updating a subscriber or UE profile and/or updating a MEI-based registry. At 334, the model training module 242 may provide an updated 5G CBSI model to the 5G CBSI module 222. At 336, the 5G CBSI module 222 may use the updated model for processing subsequent connection events and associated channel conditions, e.g., to determine a classification or connection behavior status of one or more UEs.

Note, while one or more example embodiments are described with reference to 5G/NR (new radio) networks, it should be understood that the various techniques and example embodiments described herein are not limited to 5G/NR, but may be applied to any wireless network or wireless technology, e.g., such as WLAN, LTE, or other wireless technology. For example, network or user device connection behavior or connection performance may be improved for other types of networks (e.g., WLAN, LTE, or other wireless technology), e.g., by receiving or determining connection event information and associated channel condition information with respect to an LTE UE or WLAN user device, determining a connection behavior status of the UE or user device, reporting or notifying a (LTE or WLAN, or other wireless technology) BS, AP or RAN node of the UE connection behavior status, and/or notifying core network or other network node of the UE connection behavior status of the UE, and then performing one or more network corrective actions (e.g., by the BS/AP and/or by the core network) based on the UE connection behavior status. In this manner, regardless of the wireless technology or type of wireless network, UEs having low performing connection behavior may be identified, and one or more network corrective actions may be performed to improve the connection behavior or performance of such UEs or user devices.

Further illustrative examples will now be described.

Further Details of Aspect A (operation 320, FIG. 3): Receiving Connection/Loss-of-Connection Event Info and Associated Channel Condition Information.

According to an example embodiment, connection events for a UE connecting to a 5G Hotspot Cell may include: a UE performing RACH (random access procedure, or sending a random access request) with a 5G hotspot cell; a UE successfully starting control (physical uplink control channel or sounding reference signals, PUCCH/SRS) or data (physical downlink shared channel or physical uplink shared channel, PDSCH/PUSCH) transmission on the 5G hotspot cell; and a RAN node providing the UE with a high-capacity 5G gNB/BS configuration information (e.g., for carrier aggregation as an Scell (secondary cell), or as a SgNB (secondary base station) for dual connectivity or NSA).

Loss of connection events for a UE connecting to a 5G Hotspot Cell may include any of the following resulting in UE unable to transmit/receive control and/or data channels on 5G hotspot cell, for example: High data channel retransmission events (hybrid automatic retransmission (HARQ) at MAC/PHY or automatic retransmission (ARQ) at RLC; High PDCCH transmission errors (discontinuous transmission (DTX) or no data transmission from UE in response to physical downlink control channel (PDCCH) grant); High PUCCH decoding errors Associated channel condition information with the event, corresponding to time interval preceding and/or after the event (and/or time interval before, during and/or after the event), includes: UE's signal or channel quality information on the Pcell and on the 5G hotspot cell; This can include: CQI (channel quality indication (CQI), or precoding matric indicator (PMI) and/or rank indication (RI), path loss/PHR, RACH (random access channel) timing advance, HARQ Ack/Nack, RSRP (reference signal received power), uplink signal strength and/or uplink interference and/or UL SINR signal to interference plus noise ratio), direction/angle of arrival, beam information, per-antenna measurements (signal strength and/or phase), etc.

In the context of xRAN/ORAN, this information could be reported by RAN node to RIC-near-RT over B1 (or E2) interface, as further examples.

Further details of Aspect B (operation 322, FIG. 3): Determine a classification or (or likelihood of) a connection behavior status for UE or for connections to 5G hotspot cells:

The classification or determining a connection behavior status of a UE or for a connection may be performed using AI or machine learning model or a neural network model.

The 5G-CBSI module can receive a trained machine learning/AI model or neural network model from a training module. The training module may be on ONAP or (in ORAN architecture) at RIC-non-real-time.

The 5G CBSI module may form a UE signature from the vector/sequence/trace of a UE's connection event and associated channel condition information. The AI/ML method/AI model can be applied to this UE signature, e.g., to determine a connection behavior status of a UE or for a UE's connection to a cell or 5G gNB.

The AI/ML method, AI model, or neural network model may be e.g.:

(i) clustering—determine clusters in the space of UE signature/vectors, and classify the clusters as having a normal or high performing connection behavior status, or a low performing connection behavior status, or other status or classification in order to identify those UEs that have (or are likely to be) anomalous or low performing connection behavior. For example, this may not require a prior "ground truth" where certain UEs are already classified, this can be done as 'unsupervised' training.

(ii) density estimation—based on the spread of event likelihood and/or channel conditions, identify "tail probability events" as low performing connection behavior status, or output a likelihood that the UE has a low performing connection behavior status.

(iii) supervised learning methods such as neural network or SVM—typically these require a 'ground truth' where certain UE signatures are already classified as being low performing connection behavior status, from which the classifier can be trained.

Classification can be applied to one UE at a time, or to a batch of UEs. For example, when a given UE's information (events of connection/loss of connection, and associated channel conditions) is received, the system may determine whether to classify the UE with a low performing connection behavior status or determine a likelihood of the UE being or having a low performing connection behavior. Or, the connection events plus associated channel conditions of a batch (or large number) of UEs is accumulated, and classification/clustering is applied to that.

In an illustrative example embodiment, the batch method may be used for 'offline' application—e.g., when it is deemed adequate to determine the UE's classification or connection behavior status after the UE's connection is already finished. The one-UE-at-a-time method is suitable for 'online' application, e.g., when it is required to identify the UEs that have a low (or anomalous) performing connection behavior status while the connection is still ongoing.

The 5G-CBSI module can be provided with a model, and can apply the model to an incoming UE event or a batch of UEs' events. In the case of classification (or determining a connection behavior status), the model may represent the separation boundary between 'anomalous' and 'non-anomalous' behavior, or between a low performing connection behavior, and an expected or average or high performing connection behavior in the space of UE signatures. In the case of likelihood prediction, the model may represent for example a distance of the UE signature from the nearest point on the separation boundary. The model used by the 5G-CBSI module can be trained by collecting a large number of UE signatures associated with connection/loss of connection events. In the case of clustering, the signatures can be represented as vectors in an N-dimensional space, and well-known clustering methods such as k-means may be used to identify clusters in this space. The clusters can then be ranked according to connection behavior or connection performance. For example, the clusters can be ranked according to how 'early' the UEs in the cluster connect (or lose connection) to the 5G hotspot cell, e.g., connection events or loss of connection events as compared to RSSI or other channel condition. For example, an "early" connection may include connecting to the cell based on a lower RSSI resulting in higher connection performance, while a late connection may be a connection that does not occur until RSSI is higher, resulting in lower connection performance for that cell, due to less time of the UE connected to that 5G cell, as an illustrative example. The worst-performing clusters will be the ones that either connect too late (e.g., UEs that require a higher RSSI in order to connect) or lose connection too early, and these can be tagged or classified with a low performing connection behavior status (e.g., so that RAN node, and/or other nodes, may perform one or more network corrective actions for the UE in order to attempt to improve connection behavior for the low performing UE).

As noted, UEs that have a common feature or aspect may exhibit same or similar connection behavior. A common feature or aspect may be, for example, a same UE model type, a same hardware component, a same antenna system, a same software entity or protocol entity (e.g., same SW vendor and/or same protocol entity version), or same chipset. For example, a given chipset type may give the same or a similar connection behavior (e.g., what channel conditions are required to establish and/or maintain a connection) in terms of the ability to connect to 5G hotspot cells, even within different UE implementations. Thus, the clustering/classification approach may help to identify that different UEs using the same chipset give similar behavior.

For example, a given chipset manufacturer's implementation for a particular chipset model may be used by multiple UE vendors/manufacturers. Thus, for example, the chipset implementation is a dominant factor in determining the UE behavior.

In some cases, the specifics of the UE device or handset may be dominant factors in terms of the ability to connect to 5G hotspot cells. Device or handset characteristics may be, e.g., placement of antennas, or RF loss characteristics, etc. In this case the clustering/classification approach may help to distinguish good-performing from poor-performing handsets even among those using the same chipset.

Further details of Aspect C (operation 324, FIG. 3): Generating a notification of classification or a connection behavior status (or a likelihood of a particular connection behavior status):

The 5G CBSI module can generate a notification to another network node based on the classification or connection behavior status of the UE. The other network node can be the RAN node, or an orchestration/management system such as ONAP, or in ORAN architecture, a RIC-non-real-time, or a core network element (MME/NGC). The other network node can then invoke action based on the notification: if the other node is a RAN node, then the RAN node can (during the same connection) treat the UE differently, e.g., make one or more adjustments, such as MCS, transmission power, handover thresholds, etc.

In the context of xRAN/ORAN, this notification can happen over the B1 or E2 interface, by way of example. Based on the notification, the RAN node may, for example, modify thresholds for handovers or subsequent CA/dual-connectivity attempts, or modify scheduling or MCS selection when the UE comes nearer (e.g., as RSSI begins to drop for UE) to likely loss of connection.

In the context of XRAN/ORAN, the 5G-CAI may be viewed as a module or micro-service on top of a Radio Intelligent Controller (RIC) platform. The notification it generates may be sent by the 5G CAI to another module on top of the RIC, which can then determine the optimal corrective action and notify the RAN. In this case, the interface over which the notification is sent may be a 'C1' interface which enables a module to communicate with the RIC platform itself or with other modules on the RIC platform.

Either of the two above cases (other node=RAN node, or other node=another module on top of RIC) can enable 'online' application of the method. For example, if the other node is ONAP or core network (NGC or MME), it can take corrective action. For example, the network corrective action may be to update/modify the UE's subscription profile to mark it as anomalous (or low performing), or to update an IMEI registry to mark that particular UE as a low performing UE, etc. The other network node (e.g., next generation core node or NGC) can also use an accumulation counter to keep track of the number of events classified as anomalous (or low performing connection behavior) relative to total number of connection/loss of connection events (e.g., either per UE, per group having a same feature or aspect, or total or all UEs). For the UEs for which this is high, the corrective action can be invoked. Based on the updated subscription profile, for subsequent connection attempts the RAN node can be told to treat the UE differently, e.g., which may instruct the RAN node to perform one or more network corrective actions to improve connection behavior of the UE. Also, if enough UEs of a particular type or having a same feature or aspect (e.g., same manufacturer or same chipset) display significant anomalous or low performing connection behavior for 5G connection to hotspot cells, the network operator (or core network or other node within the network) can take up the issue with the manufacturer or chipset vendor, e.g., by sending a performance report to the vendor or manufacturer, indicating low performing connection behavior for these UE models or UE model types, or for this chipset. This is typically suitable for 'offline' application.

Example Advantages: According to an example embodiment, some example advantages of the system and/or methods described herein, may include, for example:

1) an identification of UEs that may have low performing connection behavior to certain (e.g., 5G) cells, allowing network corrective actions to be performed for such UEs and/or for such connections in order to improve a connection behavior for a UE and/or for a UE with respect to specific cell(s).

2) UE performance and/or user experience may be improved by allowing the RAN node and/or core network entity/node to make network corrective actions for UE(s) that have been identified or classified as having a low performing connection behavior status, or anomalous connection behavior. In this manner, by identifying such UEs, and then notifying the RAN node of such low performing connection behavior status, this may allow such RAN nodes or cells, for example, to apply network corrective actions to allow such UEs to improve connection behavior, e.g., to allow the UE to connect earlier (e.g., at a lower RSSI) and/or remain connected longer, thereby improving overall data throughput, latency, etc., as experienced by the UE.

3) Network performance and reliability may be improved, by reducing the number of dropped connections, or by reducing the number of unsuccessful connection attempts. Also, a more efficient resource usage may be provided since fewer resources may be wasted on UEs attempting more connections after dropping a connection or after an unsuccessful connection attempt.

4) At least in some example embodiments, by allowing the 5G CBSI-module 222 to be provided in a number of different locations, e.g., on a RAN node, in the cloud, within the core network, or on a RIC (RT or non-RT), or other node or location, this may allow different vendors or equipment manufacturers to provide 5G-CBSI modules and solutions.

While a number illustrative examples are described with respect to 5G/NR (new radio) networks, the various embodiments are not limited to 5G/NR, but are applicable to any wireless networks or wireless technology, e.g., WLAN, LTE, etc.

Some further example embodiments are now described.

Figure 4:
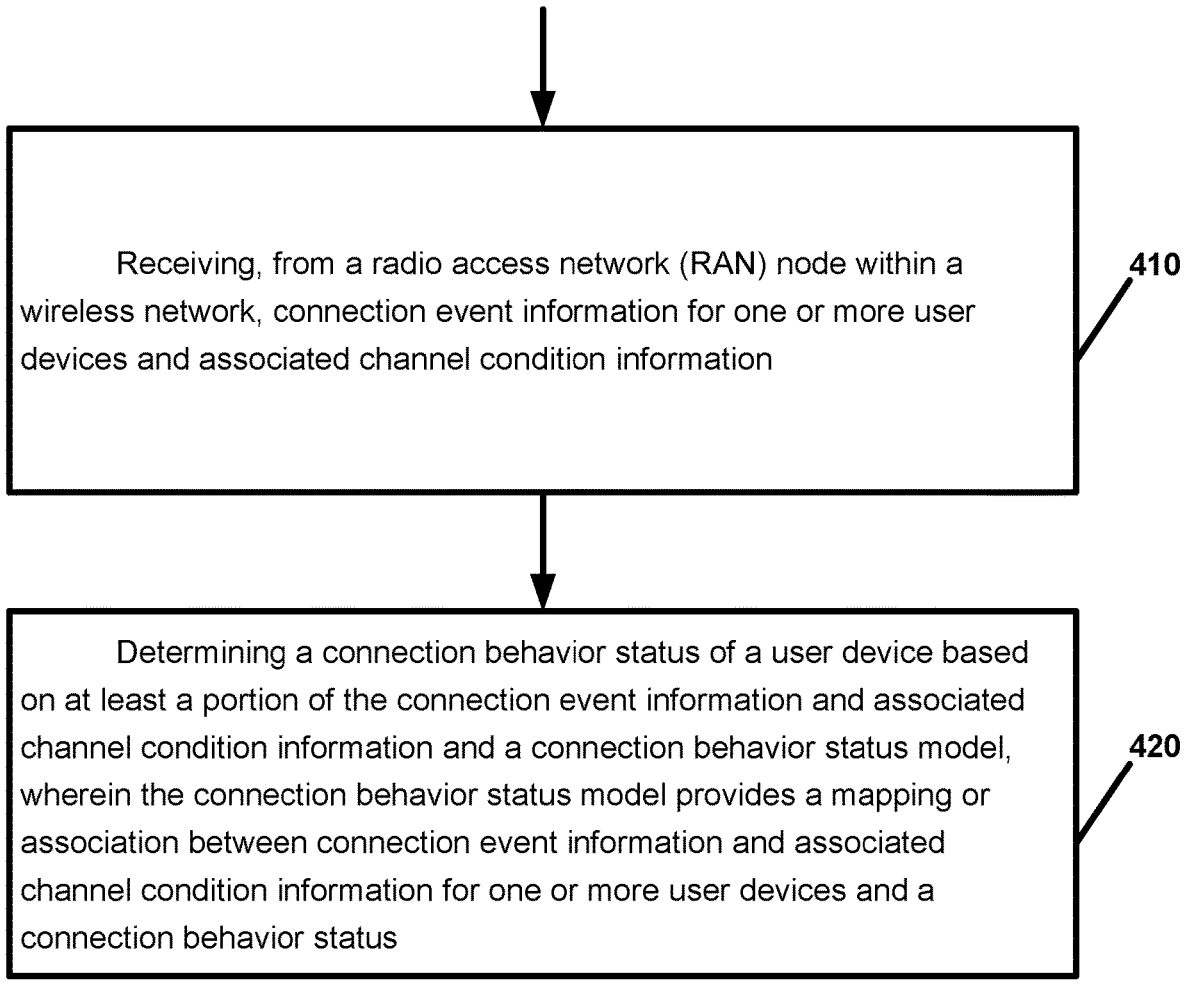
FIG. 4 is a flow chart illustrating operation of a system according to an example embodiment.

Example 1. FIG. 4 is a flow chart illustrating operation of a system according to an example embodiment. Operation 410 includes receiving, from a radio access network (RAN) node within a wireless network, connection event information for one or more user devices and associated channel condition information. Operation 420 includes determining a connection behavior status of a user device based on at least a portion of the connection event information and associated channel condition information and a connection behavior status model, wherein the connection behavior status model provides a mapping or association between connection event information and associated channel condition information for one or more user devices and a connection behavior status.

Example 2. The method of example 1, further comprising: determining the connection behavior status model that provides a mapping or association between connection event information and associated channel condition information for one or more user devices and a connection behavior status.

Example 3. The method of example 2 wherein the determining the connection behavior status model comprises: receiving the connection behavior status model that provides a mapping or association between connection event information and associated channel condition information for one or more user devices and a connection behavior status.

Example 4. The method of any of examples 2-3, wherein the determining the connection behavior status model comprises: training the connection behavior status model that provides a mapping or association between connection event information and associated channel condition information for one or more user devices and a connection behavior status.

Example 5. The method of any of examples 1-4, and further comprising: sending a message to the radio access network (RAN) node indicating the connection behavior status of the user device.

Example 6. The method of any of examples 1-5, and further comprising: sending a message to a network node indicating the connection behavior status of the user device.

Example 7. The method of any of examples 1-6, and further comprising:
performing, or sending a message to cause another network node to perform, based on the connection behavior status of the user device, a network corrective action with respect to the user device to improve a connection behavior of the user device.

Example 8. The method of any of examples 1-7: wherein the receiving, comprises receiving, from a radio access network (RAN) node within a wireless network, connection event information for at least the user device and associated channel condition information; wherein the determining a connection behavior status comprises determining a connection behavior status of the user device based on connection event information for the user device and associated channel condition information, and the connection behavior status model.

Example 9. The method of any of examples 1-8, wherein the user device is of a first user device type; wherein the receiving comprises receiving, from a radio access network (RAN) node within a wireless network, connection event information for a plurality of user devices of the first user device type and associated channel condition information; wherein the connection behavior status model comprises a connection behavior status model that provides a mapping or association between connection event information for at least one or more user devices of the first user device type and associated channel condition information and a connection behavior status.

Example 10. The method of any of examples 1-9, wherein the user device is part of a subset of user devices that have one or more common features or aspects that cause the user devices of the first subset of user devices to exhibit a same or similar connection behavior, at least part of the time; wherein the receiving comprises receiving, from a radio access network (RAN) node within a wireless network, connection event information for a plurality of user devices of the subset of user devices and associated channel condition information; wherein the connection behavior status model comprises a connection behavior status model that provides a mapping or association between connection event information for at least one or more user devices of the subset of user devices and associated channel condition information and a connection behavior status.

Example 11. The method of example 10 wherein one or more common features or aspects of the subset of user devices comprise one or more of the following: a same user device brand or manufacturer; a same user device model; user devices that include a same semiconductor chip or chipset; user devices that include a same version of a protocol entity; user devices that include a same hardware module; user devices that include a same software module; user devices that include a same antenna system or antenna configuration.

Example 12. The method of any of examples 1-11 wherein the connection event information comprises at least one of connection events and loss of connection events for one or more user devices.

Example 13. The method of any of examples 1-12 wherein the connection event information comprises at least one of the following: a connection event, including one or more of: a successful connection attempt to a cell by a user device; a user device performing a random access procedure with a cell; a user device successfully starting transmission to a cell for control signals or data; and a cell providing the user device with configuration information to allow the user device to configure itself for communication with the cell; and a loss of connection event, including one or more of: an unsuccessful connection attempt to a cell by a user device; a user device being unable to transmit or receive data or control signals to a cell; at least a threshold number or threshold rate of data retransmission events with a cell; and at least a threshold number or a threshold rate of decoding errors.

Example 14. The method of any of examples 1-13 wherein the associated channel condition information comprises at least one of the following: a channel quality information, a data error rate or block error rate, a channel state information (CSI), a reference signal received power (RSRP), a reference signal received quality (RSRQ), a signal to interference plus noise ratio (SINR), a random access (RACH) timing advance, a direction and/or angle of arrival of signals, beam information indication for transmit or receive beams, per antenna measurements for antenna strength and/or phase).

Example 15. The method of any of examples 1-14, wherein the associated channel condition information comprises one or more of: channel condition information within a threshold period of time before the connection event; channel condition information at a time of the connection event; and channel condition information within a threshold period of time after the connection event.

Example 16. The method of any of examples 7-15 wherein the network corrective action with respect to the user device to improve a connection behavior of the user device comprises at least one of: adjusting a modulation and coding scheme (MCS) of the user device, adjusting transmission power of the user device for uplink transmissions, adjusting downlink transmission power for transmissions to the user device, adjusting a retransmission timing or strategy, adjusting signal threshold(s) for handover of the user device between cells, adjusting resource scheduling for the user device, adjusting a control channel element (CCE) selection for a physical downlink control channel (PDCC), adjusting beamforming or other MIMO transmission strategy, updating a subscription profile for a user device to indicate the connection behavior status of the user device, triggering or causing an update to a subscription plan or charging/billing for a user device or subscriber, triggering or causing a call trace to collect data for the subscriber or user device connection, determining or maintaining counts of the connection events or changes to the connection behavior status of a user device, causing or triggering a problem report or status report to be generated and/or transmitted to a hardware or software or device manufacturer.

Example 17. The method of any of examples 1-16 wherein the determining a connection behavior status model comprises determining an artificial intelligence (AI) model or a neural network model.

Example 18. The method of any of examples 4-17, wherein the training the connection behavior status model comprises performing at least one of the following: training the connection behavior status model using supervised learning; training the connection behavior status model using supervised learning; and training the connection behavior status model using reinforcement learning.

Example 19. An apparatus comprising means for performing the method of any of examples 1-18.

Example 20. A non-transitory computer-readable storage medium comprising instructions stored thereon that, when executed by at least one processor, are configured to cause a computing system to perform the method of any of examples 1-18.

Example 21. An apparatus comprising: at least one processor; and at least one memory including computer program code; the at least one memory and the computer program code configured to, with the at least one processor, cause the apparatus at least to perform the method of any of examples 1-18.

Example 22. An apparatus comprising: at least one processor; and at least one memory including computer program code; the at least one memory and the computer program code configured to, with the at least one processor, cause the apparatus at least to: receive, from a radio access network (RAN) node within a wireless network, connection event information for one or more user devices and associated channel condition information; and determine a connection behavior status of a user device based on at least a portion of the connection event information and associated channel condition information and a connection behavior status model, wherein the connection behavior status model provides a mapping or association between connection event information and associated channel condition information for one or more user devices and a connection behavior status.

Example 23. The apparatus of example 22, further causing the apparatus to: determine the connection behavior status model that provides a mapping or association between connection event information and associated channel condition information for one or more user devices and a connection behavior status.

Example 24. The apparatus of example 23 wherein causing the apparatus to determine the connection behavior status model comprises causing the apparatus to: receive the connection behavior status model that provides a mapping or association between connection event information and associated channel condition information for one or more user devices and a connection behavior status.

Example 25. The apparatus of any of examples 23-24, wherein causing the apparatus to determine the connection behavior status model comprises causing the apparatus to: train the connection behavior status model that provides a mapping or association between connection event information and associated channel condition information for one or more user devices and a connection behavior status.

Example 26. The apparatus of any of examples 22-25, and further comprising causing the apparatus to: send a message to the radio access network (RAN) node indicating the connection behavior status of the user device.

Example 27. The apparatus of any of examples 22-26, and further comprising causing the apparatus to: send a message to a network node indicating the connection behavior status of the user device.

Example 28. The apparatus of any of examples 22-27, and further comprising causing the apparatus to: perform, or send a message to cause another network node to perform, based on the connection behavior status of the user device, a network corrective action with respect to the user device to improve a connection behavior of the user device.

Example 29. The apparatus of any of examples 22-38: wherein causing the apparatus to receive comprises causing the apparatus to receive, from a radio access network (RAN) node within a wireless network, connection event information for at least the user device and associated channel condition information; wherein causing the apparatus to determine a connection behavior status comprises causing the apparatus to determine a connection behavior status of the user device based on connection event information for the user device and associated channel condition information, and the connection behavior status model.

Example 30. The apparatus of any of examples 22-29, wherein the user device is of a first user device type; wherein causing the apparatus to receive comprises causing the apparatus to receive, from a radio access network (RAN) node within a wireless network, connection event information for a plurality of user devices of the first user device type and associated channel condition information; wherein the connection behavior status model comprises a connection behavior status model that provides a mapping or association between connection event information for at least one or more user devices of the first user device type and associated channel condition information and a connection behavior status.

Example 31. The apparatus of any of examples 22-30, wherein the user device is part of a subset of user devices that have one or more common features or aspects that cause the user devices of the first subset of user devices to exhibit a same or similar connection behavior, at least part of the time; wherein causing the apparatus to receive comprises causing the apparatus to receive, from a radio access network (RAN) node within a wireless network, connection event information for a plurality of user devices of the subset of user devices and associated channel condition information; wherein the connection behavior status model comprises a connection behavior status model that provides a mapping or association between connection event information for at least one or more user devices of the subset of user devices and associated channel condition information and a connection behavior status.

Example 32. The apparatus of example 31 wherein one or more common features or aspects of the subset of user devices comprise one or more of the following: a same user device brand or manufacturer; a same user device model; user devices that include a same semiconductor chip or chipset; user devices that include a same version of a protocol entity; user devices that include a same hardware module; user devices that include a same software module; user devices that include a same antenna system or antenna configuration.

Example 33. The apparatus of any of examples 22-32 wherein the connection event information comprises at least one of connection events and loss of connection events for one or more user devices.

Example 34. The apparatus of any of examples 22-33 wherein the connection event information comprises at least one of the following: a connection event, including one or more of: a successful connection attempt to a cell by a user device; a user device performing a random access procedure with a cell; a user device successfully starting transmission to a cell for control signals or data; and a cell providing the user device with configuration information to allow the user device to configure itself for communication with the cell; and a loss of connection event, including one or more of: an unsuccessful connection attempt to a cell by a user device; a user device being unable to transmit or receive data or control signals to a cell; at least a threshold number or threshold rate of data retransmission events with a cell; and at least a threshold number or a threshold rate of decoding errors.

Example 35. The apparatus of any of examples 22-34 wherein the associated channel condition information comprises at least one of the following: a channel quality information, a data error rate or block error rate, a channel state information (CSI), a reference signal received power (RSRP), a reference signal received quality (RSRQ), a signal to interference plus noise ratio (SINR), a random access (RACH) timing advance, a direction and/or angle of arrival of signals, beam information indication for transmit or receive beams, per antenna measurements for antenna strength and/or phase).

Example 36. The apparatus of any of examples 23-36, wherein the associated channel condition information comprises one or more of: channel condition information within a threshold period of time before the connection event; channel condition information at a time of the connection event; and channel condition information within a threshold period of time after the connection event.

Example 37. The apparatus of any of examples 29-36 wherein the network corrective action with respect to the user device to improve a connection behavior of the user device comprises at least one of: adjusting a modulation and coding scheme (MCS) of the user device, adjusting transmission power of the user device for uplink transmissions, adjusting downlink transmission power for transmissions to the user device, adjusting a retransmission timing or strategy, adjusting signal threshold(s) for handover of the user device between cells, adjusting resource scheduling for the user device, adjusting a control channel element (CCE) selection for a physical downlink control channel (PDCC), adjusting beamforming or other MIMO transmission strategy, updating a subscription profile for a user device to indicate the connection behavior status of the user device, triggering or causing an update to a subscription plan or charging/billing for a user device or subscriber, triggering or causing a call trace to collect data for the subscriber or user device connection, determining or maintaining counts of the connection events or changes to the connection behavior status of a user device, causing or triggering a problem report or status report to be generated and/or transmitted to a hardware or software or device manufacturer.

Example 38. The apparatus of any of examples 22-37 wherein causing the apparatus to determine a connection behavior status model comprises causing the apparatus to determine an artificial intelligence (AI) model or a neural network model.

Example 39. The apparatus of any of examples 26-38, wherein causing the apparatus to train the connection behavior status model comprises causing the apparatus to perform at least one of the following: train the connection behavior status model using supervised learning; train the connection behavior status model using supervised learning; and train the connection behavior status model using reinforcement learning.

Example 40. The apparatus of any of examples 22-39, further causing the RAN node to receive at least part of the connection event information and associated channel information from another RAN node.

Example 41. A non-transitory computer-readable storage medium comprising instructions stored thereon that, when executed by at least one processor, are configured to cause a computing system to perform a method of: receiving, from a radio access network (RAN) node within a wireless network, connection event information for one or more user devices and associated channel condition information; and determining a connection behavior status of a user device based on at least a portion of the connection event information and associated channel condition information and a connection behavior status model, wherein the connection behavior status model provides a mapping or association between connection event information and associated channel condition information for one or more user devices and a connection behavior status.

Figure 5:
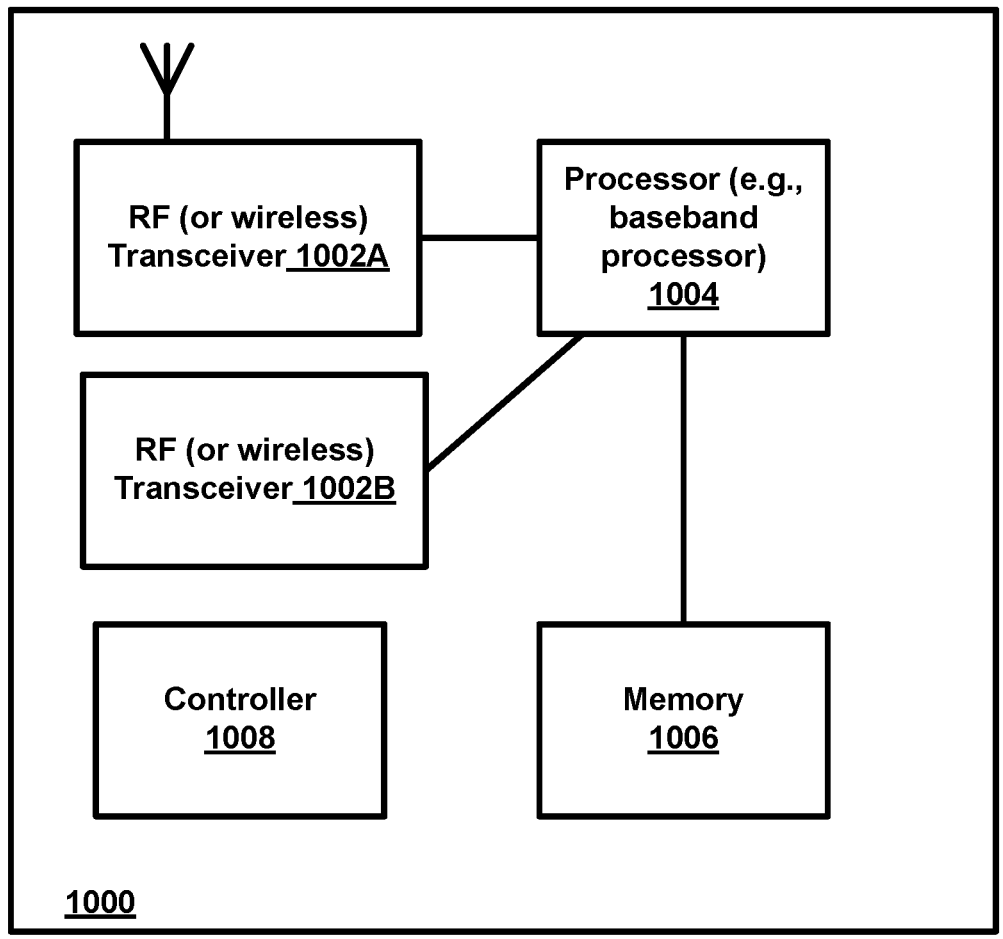
FIG. 5 is a block diagram of a wireless station (e.g., AP, BS, gNB, or user device, or other network node) according to an example embodiment.

FIG. 5 is a block diagram of a wireless station (e.g., AP, BS or user device, or other network node) 1000 according to an example embodiment. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 10, a controller (or processor) 1008 may execute software and instructions, and may provide overall control for the station 1000, and may provide control for other systems not shown in FIG. 10, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example embodiment, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    receiving, from a radio access network (RAN) node within a wireless network, connection event information for a user device and associated channel condition information;
    identifying a connection behavior status model that maps the connection event information and associated channel condition information to a connection behavior status;
    determining, using the connection behavior status model, a connection behavior status for the user device based on the connection event information and associated channel condition information, the device connection behavior indicating a low-performing connection behavior status for the user device; and
    sending a message to cause another network node, within the wireless network, to perform, based on the connection behavior status of the user device, a network corrective action with respect to the user device to improve a connection behavior of the user device, the network corrective action including updating a profile and/or registry to mark the user device as low performing.

2. The method of claim 1, and further comprising:
    sending a message to a network node indicating the connection behavior status of the user device.

3. The method of claim 1, wherein the user device is part of a subset of user devices that have one or more common features or aspects that cause the user devices of the subset of user devices to exhibit a same or similar connection behavior, at least part of the time;
    wherein the receiving comprises receiving, from a radio access network (RAN) node within a wireless network, connection event information for a plurality of user devices of the subset of user devices and associated channel condition information;
    wherein the connection behavior status model comprises a connection behavior status model that provides a mapping or association between connection event information for at least one or more user devices of the subset of user devices and associated channel condition information and a connection behavior status.

4. The method of claim 3, wherein one or more common features or aspects of the subset of user devices comprise one or more of:
    a same user device brand or manufacturer;
    a same user device model;
    user devices that include a same semiconductor chip or chipset;
    user devices that include a same version of a protocol entity;
    user devices that include a same hardware module;
    user devices that include a same software module;
    user devices that include a same antenna system or antenna configuration.

5. The method of claim 1, wherein the connection event information comprises at least one of:
    a connection event, including one or more of:
        a successful connection attempt to a cell by the user device;
        the user device performing a random access procedure with a cell;
        the user device successfully starting transmission to a cell for control signals or data; and
        a cell providing the user device with configuration information to allow the user device to configure itself for communication with the cell; and
    a loss of connection event, including one or more of:
        an unsuccessful connection attempt to a cell by the user device;
        the user device being unable to transmit or receive data or control signals to a cell;
        at least a threshold number or threshold rate of data retransmission events with a cell; and
        at least a threshold number or a threshold rate of decoding errors;
    channel condition information within a threshold period of time before the connection event;
    channel condition information at a time of the connection event;
    channel condition information within a threshold period of time after the connection event; and
    a channel quality information, a data error rate or block error rate, a channel state information (CSI), a reference signal received power (RSRP), a reference signal received quality (RSRQ), a signal to interference plus noise ratio (SINR), a random access (RACH) timing advance, a direction and/or angle of arrival of signals, beam information indication for transmit or receive beams, per antenna measurements for antenna strength and/or phase.

6. The method of claim 1, wherein the network corrective action with respect to the user device to improve a connection behavior of the user device comprises at least one of:
    adjusting a modulation and coding scheme (MCS) of the user device, adjusting transmission power of the user device for uplink transmissions, adjusting downlink transmission power for transmissions to the user device, adjusting a retransmission timing or strategy, adjusting signal threshold(s) for handover of the user device between cells, adjusting resource scheduling for the user device, adjusting a control channel element (CCE) selection for a physical downlink control channel (PDCC), adjusting beamforming or other MIMO transmission strategy, updating a subscription profile for the user device to indicate the connection behavior status of the user device, triggering or causing an update to a subscription plan or charging/billing for the user device or subscriber, triggering or causing a call trace to collect data for the subscriber or user device connection, determining or maintaining counts of the connection events or changes to the connection behavior status of the user device, causing or triggering a problem report or status report to be generated and/or transmitted to a hardware or software or device manufacturer.

7. The method of claim 1, wherein the determining a connection behavior status model comprises determining an artificial intelligence (AI) model or a neural network model.

8. The method of claim 1, further comprising training the connection model, wherein the training the connection behavior status model comprises performing at least one of:
training the connection behavior status model using supervised learning;
training the connection behavior status model using supervised learning; and
training the connection behavior status model using reinforcement learning.

9. The method of claim 1, wherein the RAN node receives at least part of the connection event information and associated channel information from another RAN node.

10. An apparatus comprising:
at least one processor; and
at least one memory including computer program code;
the at least one memory and the computer program code configured to, with the at least one processor, cause the apparatus at least to:
receive, from a radio access network (RAN) node within a wireless network, connection event information for one or more user devices and associated channel condition information;
identify a connection behavior status model that maps the connection event information and associated channel condition information to a connection behavior status;
determine, using the connection behavior status model, a connection behavior status for a user device based on the connection event information and associated channel condition information, the device connection behavior indicating a low-performing connection behavior status for the user device; and
sending a message to cause another network node, within the wireless network, to perform, based on the connection behavior status of the user device, a network corrective action with respect to the user device to improve a connection behavior of the user device, the network corrective action including updating a profile and/or registry to mark the user device as low performing.

11. The apparatus of claim 10, and further comprising causing the apparatus to:
send a message to a network node indicating the connection behavior status of the user device.

12. The apparatus of claim 10, wherein the user device is part of a subset of user devices that have one or more common features or aspects that cause the user devices of the subset of user devices to exhibit a same or similar connection behavior, at least part of the time;
wherein causing the apparatus to receive comprises causing the apparatus to receive, from a radio access network (RAN) node within a wireless network, connection event information for a plurality of user devices of the subset of user devices and associated channel condition information;
wherein the connection behavior status model comprises a connection behavior status model that provides a mapping or association between connection event information for at least one or more user devices of the subset of user devices and associated channel condition information and a connection behavior status.

13. The apparatus of claim 12, wherein one or more common features or aspects of the subset of user devices comprise one or more of:
a same user device brand or manufacturer;
a same user device model;
user devices that include a same semiconductor chip or chipset;
user devices that include a same version of a protocol entity;
user devices that include a same hardware module;
user devices that include a same software module;
user devices that include a same antenna system or antenna configuration.

14. The apparatus of claim 10, wherein the connection event information comprises at least one of:
a connection event, including one or more of:
a successful connection attempt to a cell by the user device;
the user device performing a random access procedure with a cell;
the user device successfully starting transmission to a cell for control signals or data; and
a cell providing the user device with configuration information to allow the user device to configure itself for communication with the cell; and
a loss of connection event, including one or more of:
an unsuccessful connection attempt to a cell by the user device;
the user device being unable to transmit or receive data or control signals to a cell;
at least a threshold number or threshold rate of data retransmission events with a cell; and
at least a threshold number or a threshold rate of decoding errors;
channel condition information within a threshold period of time before the connection event;
channel condition information at a time of the connection event;
channel condition information within a threshold period of time after the connection event; and
a channel quality information, a data error rate or block error rate, a channel state information (CSI), a reference signal received power (RSRP), a reference signal received quality (RSRQ), a signal to interference plus noise ratio (SINR), a random access (RACH) timing advance, a direction and/or angle of arrival of signals, beam information indication for transmit or receive beams, per antenna measurements for antenna strength and/or phase.

15. The apparatus of claim 10, wherein the network corrective action with respect to the user device to improve a connection behavior of the user device comprises at least one of:
adjusting a modulation and coding scheme (MCS) of the user device, adjusting transmission power of the user device for uplink transmissions, adjusting downlink transmission power for transmissions to the user device, adjusting a retransmission timing or strategy, adjusting signal threshold(s) for handover of the user device between cells, adjusting resource scheduling for the user device, adjusting a control channel element (CCE) selection for a physical downlink control channel (PDCC), adjusting beamforming or other MIMO transmission strategy, updating a subscription profile for the user device to indicate the connection behavior status of the user device, triggering or causing an update to a subscription plan or charging/billing for the user device or subscriber, triggering or causing a call trace to collect data for the subscriber or user device connection, determining or maintaining counts of the connection events or changes to the connection behavior status of the user device, causing or triggering a problem report or status report to be generated and/or transmitted to a hardware or software or device manufacturer.

16. The apparatus of claim 10, wherein causing the apparatus to determine a connection behavior status model comprises causing the apparatus to determine an artificial intelligence (AI) model or a neural network model.

17. The apparatus of claim 10, wherein causing the apparatus to train the connection behavior status model comprises causing the apparatus to perform at least one of:
   train the connection behavior status model using supervised learning;
   train the connection behavior status model using supervised learning; and
   train the connection behavior status model using reinforcement learning.

18. The apparatus of claim 10, further causing the RAN node to receive at least part of the connection event information and associated channel information from another RAN node.

19. The apparatus of claim 10, wherein at least part of the connection event information and associated channel information received from the RAN node is received from another RAN node via the RAN node.

20. A non-transitory computer-readable storage medium comprising instructions stored thereon that, when executed by at least one processor, are configured to cause a computing system to perform a method of:
   receiving, from a radio access network (RAN) node within a wireless network, connection event information for one or more user devices and associated channel condition information;
   identifying a connection behavior status model that maps the connection event information and associated channel condition information to a connection behavior status;
   determining, using the connection behavior status model, a connection behavior status for a user device based on the connection event information and associated channel condition information, the device connection behavior indicating a low-performing connection behavior status for the user device; and
   sending a message to cause another network node, within the wireless network, to perform, based on the connection behavior status of the user device, a network corrective action with respect to the user device to improve a connection behavior of the user device, the network corrective action including updating a profile and/or registry to mark the user device as low performing.

* * * * *